United States Patent Office 3,450,679
Patented June 17, 1969

3,450,679
PROCESS FOR POLYMERIZING CAPROLACTAM
Jan van Bergeijk, Arnhem, Netherlands, assignor to American Enka Corporation, Enka, N.C., a corporation of Delaware
No Drawing. Continuation-in-part of application Ser. No. 264,711, Mar. 12, 1963. This application June 28, 1966, Ser. No. 561,044
Claims priority, application Netherlands, Mar. 21, 1962, 276,218
Int. Cl. C08g 20/12
U.S. Cl. 260—78     4 Claims

ABSTRACT OF THE DISCLOSURE

A process for polymerizing caprolactam in an aqueous reaction mixture at a temperature of between 180° and 300° C., in which process volatiles are removed by passing a current of inert gas therethrough, the improvement wherein said current of gas is intermittently injected into said reaction mixture, said gas injections being at least four per minute, the period between injections being longer than the duration of each injection. This process involves the use of a reduced amount of inert gas and results in an efficient and high feed rate for the lactam to be polymerized.

---

This invention relates generally to the polymerization of lactams and more particularly to a method for removnig water from the reaction mixture during the polymerization of lactams by passing an inert gas therethrough. The application is a continuation-in-part of application Ser. No. 264,711, filed Mar. 12, 1963, now abandoned.

In the preparation of polyamides, it is the general practice to start the reaction using a mixture of the monomer and water. As soon as the reaction has advanced sufficiently, the water is removed by evaporation. Thus, caprolactam, for example, is polymerized in the presence of 5% by weight water or less based on the weight of the lactam and about 0.1% by weight of a chain length controlling component, i.e., phosphoric or acetic acid. In such a reaction the amount of water present is considerably higher than the amount that a polyamide having the desired degree of polymerization can be in equilibrium with at the temperatures prevailing in the last stage of the process. Because of this, the water is removed by evaporation before polymerization is completed. This may be done simply by reducing the pressure over the reaction mixture, by further heating the mixture or by passing an inert gas through the mixture.

It has been found and it is common in the prior art, particularly those cases where the reaction vessel contains large amounts of polymer, that passing an inert gas through the mixture usually is the most effective means of rapidly removing water homogeneously. However, it has now been found that this system requires, because of its low drying efficiency, a large amount of inert gas in order to obtain the desired effect and, moreover, the feed rate of the lactam must be maintained relatively low in order to achieve a high viscosity product.

The relatively poor drying efficiency and the large amount of inert gas consequently required, when passing a continuous stream of inert gas through the polyamide reaction mixture, is believed to be caused by two major factors: these are (1) the continuous stream of gas (or streams from more than one injection point) rises through the reaction mixture along a relatively narrow and fixed, vertical path. The stream, or rather column of gas bubbles, absorbs water only from that part of the mixture lining the narrow fixed, vertical path and at most, a limited amount of axial displacement of the mixture along-side the path occurs. Consequently the drying is very restricted and localized and is not widely dispersed. Poor drying efficiency also results from the fact that fresh gas bubbles continually come into contact with a part of the mixture, which has been, at least partly, dried before. (2) In a rising stream of separate bubbles of gas, the bubbles have a tendency to coalesce in vertical direction particularly when the distance between consecutive bubbles is less than four times the bubble diameter. In accordance with experimentation it has been observed that a continuous stream of relatively small gas bubbles rising through the polyamide reaction mixture emerges at the top of the fluid level in the form of a small number of large bubbles. The coalescence of gas bubbles must then necessarily reduce the contact surface between the drying medium and the polyamide reaction mixture to a considerable extent and thereby reduces the drying efficiency.

Accordingly, it is an object of this invention to provide an improved process using an inert gas for removing water from the reaction mixture during the polymerization of lactams that does not have the inherent disadvantages of the prior art process.

Another object of this invention is to provide a process using an inert gas for removing water from the reaction mixture during the polymerization of lactams that requires smaller amounts of the gas to achieve the desired effect.

Still another object is to provide a more efficient and faster process for utilizing an inert gas for removing water from the reaction mixture during the polymerization of lactams.

These and other objects will become apparent from the folowing detailed description.

In accordance with this invention, it is now possible to reduce the amount of the gaseous medium required to effectively remove the water from the reaction mixture during the polymerization of caprolactam. This is accomplished by passing the inert gas into the reaction mixture intermittently. Surprisingly it has been found that an intermittent injection of gas overcomes the above two causes of poor drying efficiency to a large extent, when at least four separate gas injections per minute are applied. While not wishing to be bound by any theory, it is believed that intermittent injection causes intermittent collapse of the stream path and a certain degree of radial mixing of fresh reaction mixture with (partly) dried mixture becomes possible. This therefore results in a more homogeneous drying of the mixture. Secondly, it is believed that by the intermittent injection of gas, the gas bubbles which form in the reaction mixture combine to a lesser extent and form into larger bubbles. Thus the bubbles remain small and therefore absorb larger amounts of water. In effect, the efficiency of the evaporation is substantially increased. Supplying the inert gas intermittently may be accomplished in various ways. For example, the intermittent injections may be used in conjunction with a continuous stream of an inert gas. The continuous stream prevent polymer from clogging the outlets of the gas supply stream. However, from the standpoint of water removal, it is preferred to essentially interrupt the flow of gas between injections. Generally, at least four injections per minute are necessary ot achieve the desired results and preferably ten to twelve should be used.

For purposes of the invention, the term "intermittent" as used herein refers to discontinuously introducing or injecting the inert gas into the reaction mass; and preferably cutting off the supply or injecting the gas at a pulsating rate of at least four per minute. The duration of the injections should be shorter than the period of interruption between injections. Preferably, the method is carried out such that the period between injections is twice the duration of the injection itself. It has been found that in this way the bubbles of inert gas remain separated to a very high degree.

The amount of inert gas required for removing the water is directly related to the manner and apparatus in which the polymerization is carried out. If the polymerization is conducted such that the path of the gas bubbles through the polymer melt is short, then a larger amount of gas is required than if said path is relatively long. In the latter case, more time is available for the inert gas to become saturated with water vapor. The amount of gas injected and the distance covered thereby through the polymer are also dependent on the shape of the reaction vessel. If the polyamide is prepared by an coninuous process in which a liquid mixture of the lactam and water under atmospheric pressure flow along a slightly inclined plane from the horizontal, in order to allow the water to escape, following which the reaction mass is fed downwardly along an almost vertical plane countercurrent with an upwardly bubbling gas, the ratio between the horizontal and the vertical flow zones should be considered in connection with the amount of inert gas and the length of the path. If the bubbles in the vertical flow zone cover a distance of at least 3 meters, then the amount of the gas required is at least 0.1 liter per kilogram of the polymerization mixture. In general, this amount will be 1 to 2 liters per kilogram. If the length of the vertical zone is less than 3 meters, the minimum amount of gas will have to be larger. However, it is seldom necessary to use more than 5 liters of gas per kilogram of polymer whatever the conditions.

To obtain the desired degree of polymerization, it is not only essential to reduce the water content of the reaction mixture to a value at which the polyamide having the desired degree of polycondensation can be in equilibrium, but in addition this equilibrium should be closely approached. This is not achieved until some time after obtaining the desired water content. In this condition, conditions in the aforementioned horizontal-vertical flow zone method are preferably so chosen that the distance which the inert gas passes through the reaction mixture is about half the vertical distance covered by the reaction mixture. However, the distance is not particularly critical.

To further illustrate the invention, the following examples are given. However, the invention is not intended to be limited thereby.

Example I

To one end of a channel slightly inclined off the horizontal having a length of 20 meters, a height of 100 centimeters, and a width of 9 centimeters, was fed epsilon caprolactam having mixed therein 0.15% by weight acetic acid and 0.5% by weight water. The mixture was fed at a rate of 160 kilograms per hour. The temperature of the channel was maintained at about 270° C. A vertically positioned tube having a diameter of 50 centimeters and a height of 500 centimeters was connected to the discharge end of the channel. A temperature of 260° C. was maintained in the tube. Connected to the lower end of this tube was a molding device, such as a spinning apparatus for mono- or multi-filaments.

The horizontal channel and vertical tube were covered at the top, the covering being connected to a rectifying column which was kept at a temperature of 100° C. With the aid of this rectifying column, caprolactam vapor and part of the water vapor were condensed. The condensate was returned to the feed end of the channel. The level of the reaction mixture in the channel was maintained at 75 centimeters from the bottom of the channel. Nitrogen was injected at a rate of 2.5 liters per minute in the vertical tube 200 centimeters under the surface of the melt. Ten nitrogen injections per minute were made, each of which lasted two seconds. The specific viscosity of the polyamide prepared was 1.0 and the percentage of substances soluble in methanol was 10.5%.

Example II

Under the conditions set out in Example I, no nitrogen was injected. The same viscosity was obtained. It was observed the feed rate of the reaction mixture could only be 130 kilograms per hour.

Example III

A supply of nitgrogen was continuously fed through the same reaction mass set forth in Example I. The feed rate of the reaction mixture was observed and found that it could be higher than 130 kilograms per hour. However, in order to obtain the same properties in the polymerized product to those of Example I, the rate had to be less than 160 kilograms per hour; the decreased feed rate permitting an equivalent and acceptable product was found to be at 145 kilograms per hour. Further, undesirable foaming was observed in the reaction vessel. The foaming seriously interfered with the process since the level of the liquid being polymerized was very difficult to control and therefore interfered with proper metering of the liquid to the prepolymerization zone.

Thus from the foregoing examples, it will be appreciated that intermittent injection has a definite advantage and allows an increased feed rate of the mass being polymerized, and wherein the removal of volatiles at the increased rate is equal to or better than where a continuous stream of inert gas is used.

The horizontal channel may be filled to a higher level, for instance, to 100 centimeters or to a lower level, for instance to 50 centimeters or lower. Of course if the level it to be higher than 100 centimeters, the height of the side walls of the channel must be increased. The amount of caprolactam which is fed per unit of time is dependent on the level to which the channel is filled and thus may be increased as the level is raised.

The inert gas may be injected in the reaction vessel in one place. Preferably, however, it is simultaneously or alternately injected at several points. For example, the injection may take place at 4 to 6 points distributed over the circumference of the vertical tube at the desired level. These injection points may also be provided at various levels.

While nitrogen is preferred, other inert substances may be used such as hydrogen, carbon dioxide, or gaseous hydrocarbons, or liquids which evaporate upon injection into the melt, for example, benzene. With vaporizable liquids, however, the temperature of the rectifying column must be chosen such that the vapors formed escape from the polymerization apparatus.

Numerous other modifications, variations and embodiments within the scope of this invention will be apparent to those skilled in the art. The invention therefore is intended to be limited only as set forth in the following claims.

What is claimed is:
1. In the process for polymerizing caprolactam in an aqueous reaction mixture at a temperature between 180° and 300° C., the volatiles present in said mixture being removed by passing a current of inert gas therethrough, the improvement which comprises periodically interrupting said current of inert gas by injecting said gas into said reaction mixture intermittently, said injections being at least four per minute, the period between said injections being longer than the duration of each injection.

2. The process of claim 1 wherein said inert gas is nitrogen.

3. The process of claim 1 wherein the total volume of said injected gas is not greater than two liters per kilogram of said reaction mixture.

4. The process of claim 1 wherein said inert gas is injected intermittently into a vertically downward flowing reaction mixture at a point substantially beneath the upper end of the vertical flow zone of said reaction mixture, said injected gas rising countercurrently to said reaction mixture at the upper end of said vertical flow zone.

References Cited

UNITED STATES PATENTS

| | | | |
|---|---|---|---|
| 2,241,322 | 5/1941 | Hanford | 260—78 |
| 2,615,863 | 10/1952 | Flory | 260—78 |
| 2,867,805 | 1/1959 | Ludwig | 260—78 |
| 2,902,475 | 9/1959 | Burkhard | 260—78 |
| 2,923,699 | 2/1960 | Indest et al. | 260—78 |
| 2,987,506 | 6/1961 | Lum | 260—78 |
| 3,031,433 | 4/1962 | Monroe | 260—78 |
| 3,171,829 | 3/1965 | Wiesner et al. | 260—78 |

HAROLD D. ANDERSON, *Primary Examiner.*

U.S. Cl. X.R.

260—95